US012571214B2

(12) United States Patent
Skorina et al.

(10) Patent No.: US 12,571,214 B2
(45) Date of Patent: Mar. 10, 2026

(54) CERAMIC GRANULES WITH A PHOTOCATALYTIC COATING AND METHOD OF MAKING

(71) Applicant: 3M INNOVATIVE PROPERTIES COMPANY, St. Paul, MN (US)

(72) Inventors: Taisiya Skorina, Woodbury, MN (US); Rebecca L. A. Everman, Falcon Heights, MN (US); Jean A. Tangeman, Minneapolis, MN (US); Eric J. VanBruggen, Hudson, WI (US); Kenton D. Budd, Woodbury, MN (US); Rachael A. T. Gould, Forest Lake, MN (US); Robert P. Brown, Hudson, WI (US); Lara K. N. Ughetta, Woodbury, MN (US); Jonathan A. Hubin, White Bear Lake, MN (US); Zachary M. Schaeffer, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/408,421

(22) Filed: Jan. 9, 2024

(65) Prior Publication Data

US 2024/0141649 A1     May 2, 2024

Related U.S. Application Data

(62) Division of application No. 17/755,296, filed as application No. PCT/IB2020/060671 on Nov. 12, 2020, now abandoned.

(60) Provisional application No. 62/936,855, filed on Nov. 18, 2019.

(51) Int. Cl.
*E04D 7/00* (2006.01)
*C04B 111/00* (2006.01)
*E04D 1/00* (2006.01)

(52) U.S. Cl.
CPC .... *E04D 7/005* (2013.01); *C04B 2111/00586* (2013.01); *E04D 2001/005* (2013.01)

(58) Field of Classification Search
None
See application file for complete search history.

(56) References Cited

U.S. PATENT DOCUMENTS

| | | | |
|---|---|---|---|
| 5,411,803 A | 5/1995 | George et al. | |
| 6,228,480 B1 | 5/2001 | Kimura et al. | |
| 6,300,296 B1 | 10/2001 | Bergeron et al. | |
| 6,881,701 B2 | 4/2005 | Jacobs | |
| 8,207,079 B2 | 6/2012 | Kitazaki et al. | |
| 8,993,471 B2 | 3/2015 | Bai et al. | |
| 2003/0190431 A1 | 10/2003 | Jacobs | |
| 2005/0072110 A1 | 4/2005 | Shiao et al. | |
| 2008/0241472 A1 | 10/2008 | Shiao et al. | |
| 2010/0151199 A1* | 6/2010 | Shiao | E04D 7/005 |
| | | | 427/221 |
| 2011/0086201 A1 | 4/2011 | Shiao et al. | |
| 2011/0223385 A1 | 9/2011 | Shiao et al. | |
| 2012/0067391 A1* | 3/2012 | Shiao | H10N 10/13 |
| | | | 29/890.033 |
| 2014/0248467 A1 | 9/2014 | Shiao et al. | |
| 2015/0252566 A1 | 9/2015 | Tangeman et al. | |
| 2016/0300296 A1 | 10/2016 | Alonso Cembrano | |
| 2017/0259246 A1* | 9/2017 | Lee | B01J 35/39 |
| 2019/0112227 A1 | 4/2019 | Skorina et al. | |

FOREIGN PATENT DOCUMENTS

| | | |
|---|---|---|
| CA | 2800585 A1 | 6/2013 |
| EP | 1559753 A2 | 8/2005 |
| WO | 2001071121 A1 | 9/2001 |
| WO | 2013192336 A1 | 12/2013 |
| WO | 2015112590 A1 | 7/2015 |
| WO | 2017200843 A1 | 11/2017 |
| WO | 2017200844 A1 | 11/2017 |
| WO | 2018234942 A1 | 12/2018 |
| WO | 2018234943 A1 | 12/2018 |

OTHER PUBLICATIONS

International Search Report for PCT International Application No. PCT/IB2020/060671, mailed on Feb. 10, 2021, 4 pages.
Yan Zhou et al., China University of Mining and Technology Press, Road Engineering Construction Technology, Nov. 30, 2013, pp. 114-115.
Levinson, "A novel technique for the production of cool colored concrete tile and asphalt shingle roofing products", Solar Energy Materials & Solar Cells, 2010, vol. 94, pp. 946-954.
Shiraishi, "Rutile Crystallites Isolated from Degussa (Evonik) P25 TiO2: Highly Efficient Photocatalyst for Chemoselective Hydrogenation of Nitroaromatics", ACS Catalysis, 2013, vol. 03, No. 10, pp. 2318-2326.
Hanaor, Review of the Anatase to Rutile Phase Transformation, J Mater Sci (2011) 46, pp. 855-874.

(Continued)

*Primary Examiner* — Ronak C Patel

(57) ABSTRACT

A method is disclosed for producing photocatalytic coated ceramic granules. The method involves providing a coatable composition containing an inorganic binder and a variety of photocatalytic particles, such as TiO2, ZnO, Ti(OH)4, doped derivatives, or combinations thereof. These photocatalytic particles have a surface area per weight of no more than 15 m2/g. The coatable composition is then applied to uncoated base ceramic granules, resulting in intermediate coated granules. Finally, the intermediate coated granules are heated at a temperature of at least 700° C., leading to the formation of photocatalytic coated ceramic granules. These granules exhibit a Total Solar Reflectance (TSR) value of at least 0.7. This method offers an efficient and effective way to produce ceramic granules with enhanced photocatalytic properties.

13 Claims, No Drawings

(56)     References Cited

OTHER PUBLICATIONS

Mavracic et al., Similiarity Between Amorphous and Crystalline Phases: The Case of TiO2, J. Phys. Chem. Lett. 2018, 9, pp. 2985-2990.
Ti-Pure R-101 Titanium Dioxide, The Chemours Company FC, LLC, 2020.

* cited by examiner

CERAMIC GRANULES WITH A PHOTOCATALYTIC COATING AND METHOD OF MAKING

CROSS-REFERENCE TO RELATED APPLICATIONS

This application is a divisional of Ser. No. 17/755,296, filed Apr. 26, 2022, which is a national stage filing under 35 U.S.C. 371 of PCT/IB2020/060671, filed Nov. 12, 2020, which claims the benefit of U.S. Provisional Patent Application No. 62/936,855, filed Nov. 18, 2019, the disclosure of which is incorporated by reference in its/their entirety herein.

BACKGROUND

There are a variety of known titania-based photocatalytic coatings used on roofing granules to provide, e.g., self-cleaning and smog-reducing functionality. An exemplary formula includes nano-sized titania (anatase-rutile mixture) embedded in an inorganic binder. Under sunlight, photo-induced redox chemistry of $TiO_2$ eliminates soiling and air pollutants adsorbed on the granule surface, including organic compounds and atmospheric NOR. For example, photocatalytic oxidation enables the removal of NO from the air through conversion to nonvolatile $[NO_3^-]$-containing compounds.

Existing photocatalytic coating technology is incompatible with the current manufacturing processes for certain "highly reflective" roofing granules (granules with high total solar reflection), where firing temperatures are 300-400° C. higher than that for conventional granules. Such aggressive heat-treatment significantly lowers the photocatalytic activity of currently used photocatalytic coatings. Coating of existing photocatalytic formulas on pre-fired granules followed by firing at lower temperatures compatible with the coating is possible but requires an extra processing step and energy input. Thus, new photocatalytic coating compositions are needed that are compatible with the processing temperatures required for highly reflective granules.

SUMMARY OF THE DISCLOSURE

The present disclosure provides coated ceramic granules.

In one embodiment, the disclosure provides a plurality of coated ceramic granules including: base ceramic granules, each having an outer surface; and a photocatalytic coating disposed on the outer surface, wherein the photocatalytic coating includes an inorganic binder and a plurality of photocatalytic particles selected from $TiO_2$, ZnO, $Ti(OH)_4$, doped derivatives thereof, and combinations thereof, wherein the photocatalytic particles have a surface area per weight of the particles of no more than 30 square meters per gram (m^2/g); and wherein the coated ceramic granules have a Total Solar Reflectance of at least 0.7.

In another embodiment, a method of making photocatalytic coated ceramic granules that include base ceramic granules, each having an outer surface, and a photocatalytic coating disposed on the outer surface, is provided. The method includes: providing a coatable composition containing an inorganic binder and a plurality of photocatalytic particles selected from $TiO_2$, ZnO, $Ti(OH)_4$, doped derivatives thereof, and combinations thereof, wherein the photocatalytic particles have a surface area per weight of the particles of no more than 30 square meters per gram (m^2/g); applying the coatable composition to uncoated base ceramic granules to form intermediate coated granules; and heating the intermediate coated granules at a temperature of at least 700° C. to produce the photocatalytic coated ceramic granules having a Total Solar Reflectance (TSR) of at least 0.7.

The term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the phrases "at least one" and "one or more." The phrases "at least one of" and "comprises at least one of" followed by a list refers to any one of the items in the list and any combination of two or more items in the list.

The term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION OF ILLUSTRATIVE EMBODIMENTS

The present disclosure provides coated ceramic granules. Such ceramic granules include a photocatalytic coating disposed thereon. The coated granules, when utilized in building materials, are capable of significantly reducing and/or preventing solar and/or environmental degradation on the resultant building materials.

In one embodiment, the disclosure provides a plurality of coated ceramic granules including: base ceramic granules, each having an outer surface; and a photocatalytic coating disposed on the outer surface, wherein the photocatalytic coating includes an inorganic binder (i.e., a "photocatalytic coating binder") and a plurality of photocatalytic particles selected from $TiO_2$, $ZnO$, $Ti(OH)_4$, doped derivatives thereof, and combinations thereof, wherein the photocatalytic particles have a surface area per weight of the particles of no more than 30 square meters per gram ($m^2/g$). The coated ceramic granules have a Total Solar Reflectance (TSR) (as determined by the Total Solar Reflectance Test described in the Examples Section) of at least 0.7, and in certain embodiments, at least 0.75, or at least 0.8.

The photocatalytic coating includes an inorganic binder and a plurality of photocatalytic particles. The photocatalytic particles are sufficiently distributed throughout the coating so that at least a portion of some of the photocatalytic particles are exposed on the surface of the coating. Photocatalytic particles, upon activation or exposure to sunlight, establish both oxidation and reduction sites. These sites are capable of preventing or inhibiting the growth of algae on the granules and eliminating air pollutants adsorbed on the granule surface, including organic compounds and atmospheric $NO_x$. The function of the inorganic binder is to adhere the coating to the base ceramic granules.

The coated granules of the present disclosure are ideally suited for use in various applications in building materials. For example, the coated granules are well suited for use as roofing granules. The coated granules may be applied to warm bituminous coated shingle base material of a felt or fiberglass. Additionally, the coated granules of the present disclosure may be used in various interior and exterior products such as, for example, roofing materials, concrete and cement based materials, plasters, asphalts, ceramics, stucco, grout, plastics, and glass. Additional examples include pool surfaces, wall coverings, siding materials, flooring, filtration systems, cooling towers, buoys, seawalls, retaining walls, docks, and canals so as to provide a surface capable of remaining free from discoloration.

When the photocatalytic coating is utilized to coat roofing granules, the granules reduce or prevent transmission of light, particularly ultraviolet light, from reaching the underlying asphalt. Exposure of asphalts to UV light, especially light in the range from approximately 290 nm to 430 nm, is known to accelerate undesirable weathering of the asphalt resulting in water solubility, loss of thermoplasticity, cracking, and ultimately failure of the shingle. As a result, the adhesive bond between the asphalt to the granules is destroyed and the granules become removed from the asphaltic base. In certain embodiments, the photocatalytic coatings of the present disclosure are capable of reducing the IN light transmittance to 2% or less, or to 1% or less.

In certain embodiments, the photocatalytic coatings of the coated ceramic granules described herein demonstrate photocatalytic activity, measured as described in the Examples Section, of greater than $10 \times 10^5$, or greater than $100 \times 10^5$ in relative TPA activity units (defined in the Example Section).

Base Ceramic Granules

Base ceramic granules include ceramic particles. Herein, "ceramic" refers to a solid material comprising an inorganic compound of metal, non-metal, or metalloid atoms primarily held in ionic and covalent bonds. It is often an oxide, nitride, or carbide (e.g., a silicon oxide, boron oxide, phosphorous oxide), and may include at least one of a carbon or a nitrogen, in at least one of an amorphous, crystalline, or glass-ceramic form. Ceramic materials are brittle, hard, strong in compression, and weak in shearing and tension. They withstand chemical erosion that occurs in other materials subjected to acidic or caustic environments.

Typical base ceramic granules of the present disclosure have a high Total Solar Reflectance (TSR). Typically, the base ceramic granules have a TSR (as determined by the Total Solar Reflectance Test described in the Examples Section) of at least 0.7, and in certain embodiments, at least 0.75, or at least 0.8.

In one embodiment, the base ceramic granules may have a core-shell structure. In another embodiment, the base ceramic granules include ceramic particles bound together with or without an inorganic binder (no core-shell structure).

The ceramic granules that do not have a core-shell structure may be sintered (e.g., at a temperature in a range of 650° C. to 900° C.) with or without an inorganic binder. Examples of granules that do not include an inorganic binder are disclosed, for example, ins U.S. Publication No. 2015/0252566 (Tangeman et al.). Base ceramic granules that include an inorganic binder (i.e., a "base granule binder" distinct from the photocatalytic coating binder, although these binders could be compositionally the same or similar) optionally include a hardener. Examples of such granules that include an inorganic binder are disclosed, for example, in International Publication Nos. WO 2017/200844, WO 2018/234942 and WO 2018/234943 (all to 3M Innovative Properties Company).

The ceramic granules that have a core-shell structure may include an inorganic (e.g., ceramic) core having an outer surface and a shell on and surrounding the outer surface. In certain embodiments, the shell includes ceramic particles bound together with an inorganic binder (a base granule binder).

In certain embodiments, the inorganic core of the core-shell granules includes a solid ceramic core. Herein, "solid ceramic core" refers to a ceramic that is substantially solid (i.e., has no more than 10 percent porosity, based on the total volume of the core). In certain embodiments, the inorganic core includes at least one of a silicate (e.g., silicate rock) (e.g., aluminosilicate (including aluminosilicate rock) and alkali aluminosilicate (including alkali aluminosilicate rock)), aluminate (including aluminate rock) (e.g., bauxite), or silica. Typically, the inorganic core is at least one of a crystalline, a glass, or a glass-ceramic. Such materials can be obtained from conventional roofing granule sources known in the art. Further crystalline, glass, or glass-ceramic materials can be made using techniques known in the art.

In certain embodiments, the base granule itself (in the non-core-shell structure) or shell of a base granule includes ceramic particles bound together with an inorganic binder. In some embodiments, the ceramic particles include at least one component with Total Solar Reflectance (as determined by the Total Solar Reflectance Test described in the Examples Section) of at least 0.7, and in certain embodiments, at least 0.75, or at least 0.8. Such exemplary ceramic particles include aluminum hydroxide, a metal or metalloid oxide (e.g., silica (e.g., crystoballite, quartz, etc.), an aluminate (e.g., alumina, mullite, etc.), an aluminosilicate (e.g., feldspar, clay, etc.), a titanate (e.g., titania), and zirconia), a silicate glass (e.g., soda-lime-silica glass, a borosilicate glass), porcelain, calcite, or marble. In some embodiments, the ceramic particles include minerals, such as feldspars or nepheline syenite. Exemplary sources of ceramic particles include Vanderbilt Minerals, LLC, Norwalk, CT, Dadco, Lausanne, Switzerland, American Talc Company, Allamoore, TX, Imerys, Inc., Cockeysville, MD, and Cristal Metals, Woodridge, IL.

In certain embodiments, the inorganic binder of the base granule (which may be throughout the base granule or in a shell of a core-shell base granule) includes a reaction product of at least an alkali silicate and a hardener. In certain embodiments, the inorganic binder of the base granule (which may be throughout the base granule or in a shell of a core-shell base granule) includes a reaction product of at least an alkali silicate and a hardener and further an alkali silicate itself.

In certain embodiments, the shell of the core-shell granules includes at least first and second concentric layers, wherein the first concentric shell layer is closer to the core than the second concentric shell layer, wherein the first concentric shell layer includes ceramic particles bound together with an inorganic binder. In this embodiment, the inorganic binder of the first concentric shell layer (i.e., a base granule binder) includes a reaction product of at least an alkali silicate and hardener (in some embodiments, further including alkali silicate itself).

Herein, a "hardener" refers to a material that initiates and/or enhances hardening of an aqueous silicate solution; hardening implies polycondensation of dissolved silica into three-dimensional Si—O—Si(Al, P, B) bond network and/or crystallization of new phases; in some embodiments, the granules comprise excess hardener. In certain embodiments, the hardener is amorphous. In this context, "amorphous" refers to a material that lacks any long-range crystal structure, as determined by X-ray diffraction. Examples of hardeners include aluminum phosphate, an aluminosilicate, a cryolite, a calcium salt, and a calcium silicate. Exemplary aluminosilicate compounds include clay having the formula $Al_2Si_2O_5(OH)_4$, kaolin having the formula $Al_2O_3 \cdot 2Si_2O_2 \cdot 2H_2O$.

Suitable alkali silicates include cesium silicate, lithium silicate, a potassium silicate, or a sodium silicate. Exemplary alkali silicates are commercially available, for example, from PQ Corporation, Malvern, PA. In some embodiments, the inorganic binder of the base granule further includes reaction product of at least an alkali silicate and an amorphous aluminosilicate hardener.

In the base ceramic granules that do not include a core-shell structure, the ceramic particles are present in an amount of greater than 50 percent by weight (wt-%) of the respective granule. In some embodiments, this amount is greater than 55 wt-%, greater than 60 wt-%, greater than 65 wt-%, greater than 70 wt-%, greater than 75 wt-%, greater than 80 wt-%, or even greater than 85 wt-%, based on the total weight of each granule. In some embodiments, the ceramic particles are present in a range of greater than 50 wt-% and up to 85 wt-%, or even greater than 60 wt-% and up to 85 wt-%, based on the total weight of each granule. In such base ceramic granules that do not include a core-shell structure, each granule has a total porosity in a range of greater than 0 and up to 60 volume percent (vol-%), based on the total volume of the respective granule. In some embodiments, the total porosity of such granules is in a range of 5 vol-% to 60 vol-%. 20 vol-% to 60 vol-%, 5 vol-% to 50 vol-%, 20 vol-% to 50 vol-%, or even 20 vol-% to 40 vol-%. Such base ceramic granules are disclosed, for example, in International Publication No. WO 2017/200844 (3M Innovative Properties Company).

In the base ceramic granules that include a core-shell structure in which the shell includes ceramic particles bound together with an inorganic binder, the ceramic particles are present in an amount of greater than 50 percent by weight (wt-%) of the shell of the respective granule, based on the total weight of the shell of the respective granule. In some embodiments, this amount is greater than 55 wt-%, greater than 60 wt-%, greater than 65 wt-%, greater than 70 wt-%, greater than 75 wt-%, greater than 80 wt-%, or even greater than 85 wt-%. In some embodiments, the ceramic particles are present in a range of greater than 50 wt-% and up to 85 wt-%, or even greater than 60 wt-% and up to 85 wt-%. In such base ceramic granules in which the shell includes ceramic particles bound together with an inorganic binder, the shell of each granule has a total porosity in a range of greater than 0 and up to 60 volume percent (vol-%), based on the total volume of the shell of the respective granule. In some embodiments, the total porosity of the shell is in a range of 5 to 60 vol-%, 20 to 60 vol-%, 5 to 50 vol-%, 20 to 50 vol-%, or even 20 to 40 vol-%. The shell of each granule has a volume of at least 40 vol-%, based on the total volume of the respective granule. In some embodiments, the shell of each granule has a volume of greater than 45 vol-%, greater than 50 vol-%, greater than 55 vol-%, greater than 60 vol-%, greater than 65 vol-%, greater than 70 vol-%, greater than 75 vol-%, greater than 80 vol-%, or even greater than 85 vol-%. In some embodiments, the shell of each granule has a volume in a range of greater than 50 vol-% and up to 85 vol-%, or even greater than 60 vol-% and up to 85 vol-%. Such ceramic core-shell particles are disclosed, for example, in International Publication No. WO 2018/234942 (3M Innovative Properties Company).

In the base ceramic granules that include a core-shell structure in which the shell includes at least first and second concentric layers, wherein the first concentric shell layer is closer to the core than the second concentric shell layer, wherein the first concentric shell layer includes first ceramic particles bound together with a first inorganic binder, the second layer includes a second inorganic binder and optionally second ceramic particles. If present, the second ceramic particles are bound together with the second inorganic binder, wherein the second inorganic binder includes a reaction product of at least an alkali silicate and a hardener (in some embodiments further comprising alkali silicate itself). In such embodiments, for a given granule, the first ceramic particles are present in a first weight percent with respect to the total weight of the first layer and the second ceramic particles are present in the second layer of the same granule in a second weight percent with respect to the total weight of the second layer, wherein for a given granule, the first weight percent is greater than the second weight percent, wherein the shell of each granule collectively has a volume of at least 40 vol-% (in some embodiments, greater than 45 vol-%, greater than 50 vol-%, greater than 55 vol.-%, greater than 60 vol-% greater than 65 vol-%, greater than 70 vol-%, greater than 75 vol-%, greater than 80 vol-%, or even greater than greater than 85 vol-%; in some embodiments, in a range of greater than 50 vol-% and up to 85 vol-%, or even greater than 60 vol-% and up to 85 vol.-%), based on the total volume of the respective granule. Such ceramic core-shell particles are disclosed, for example, in international Publication No. WO 2018/234943 (3M Innovative Properties Company).

In certain embodiments, the core has a diameter of at least 200 micrometers (i.e., microns). In certain embodiments, the shell has a thickness of at least 50 micrometers. In certain embodiments, the reflective shell coating of the base ceramic core-shell particles is up to 400 microns thick.

In certain embodiments, the ceramic particles of each ceramic base granule include no more than 10 wt-% $TiO_2$, and/or no more than 10 wt-% $Al_2O_3$, based on the total weight of either the core or base ceramic granule for the respective core or base ceramic granule.

Photocatalytic Coating

The photocatalytic coating includes an inorganic binder (i.e., a photocatalytic coating binder distinct from the binder(s) of the base ceramic granules, although these binders could be compositionally the same or similar) and a plurality of photocatalytic particles selected from ZnO, $Ti(OH)_4$, doped derivatives thereof, and combinations thereof.

Photocatalytic particles suitable flit use on the base ceramic granules include transition metal photocatalysts such as $TiO_2$, ZnO, $Ti(OH)_4$, doped derivatives thereof (e.g., doped with nitrogen), or combinations thereof. Preferred photocatalysts are particles of $TiO_2$ (e.g., anatase $TiO_2$).

Characteristics utilized to distinguish particles from one another include the mean particle size (primary particle size) and the surface area per weight of particles. The mean particle size may be determined by laser diffraction as described in the Examples Section. The surface area per weight of particles may be determined through nitrogen adsorption as described in the Examples Section.

In certain embodiments, the photocatalytic particles of the present disclosure have a mean particle size of at least 100 nanometers (nm), and in certain embodiments, at least 200 nm, at least 500 nm, or at least 1000 nm. In certain embodiments, the photocatalytic particles of the present disclosure have a mean particle size of up to 3000 nm, and in certain embodiments, up to 2000 nm, or up to 1000 nm.

In certain embodiments, the photocatalytic particles of the present disclosure have a surface area per weight of the particles of no more than 30 square meters per gram ($m^2/g$), and in certain embodiments, no more than 25 $m^2/g$, no more than 20 $m^2/g$, no more than 15 $m^2/g$, no more than 14 $m^2/g$, no more than 13 $m^2/g$, no more than 12 $m^2/g$, no more than 11 $m^2/g$, or no more than 10 $m^2/g$. In certain embodiments, the photocatalytic particles of the present disclosure have a surface area per weight of the particles of at least 1 $m^2/g$. Such surface areas are presented in terms of Brunauer-Emmett-Teller (BET) specific surface area (SSA) (surface area per mass), which can be determined by Nitrogen absorption, as described in the Examples Section. Herein, the recited surface areas are of the photocatalytic particles prior to incorporation into the granules.

Upon incorporation into the granules, and processing, such surface area would typically be the same or reduced. When incorporated into granules, a direct measurement is more difficult unless the total surface area the particles is a large fraction of that of the overall granules, and the majority of the surface remains exposed and not covered by the binder. In most cases, the surface area of the photocatalytic binder. In most cases, the surface area of the photocatalytic particles will decrease somewhat due to granule processing, but the change is small under conditions that maintain desirable photocatalytic activity.

The surface area of the photocatalytic particles can also be calculated from images of the photocatalytic particles (including within the final granules), based on approximate spherical geometry. Transmission Electron Microscopy (TEM) or Scanning Electron Microscopy (SEM) images can be used to measure the diameters of a large number of particles, either manually or with, for example, image analysis software.

If the particle size distribution is narrow, specific surface area (S/m) can be calculated as follows.

$$S/V = (4\ pi\ r\hat{}2)/(\tfrac{4}{3}\ pi\ r\hat{}3) = 3/r. \quad m = Vd. \quad S/m = 3/rd$$

S=surface area
V=volume
r=mean particle radius
d=density
m=mass

For broader particle size distributions, the calculation is repeated and summed for selected size ranges adequately covering the distribution. For example, if 20% of the distribution had particle radii ranging from r1-r3 centered around r2, and 60% ranged from r3-r5 centered around r4, and 20% ranged from r5-r7 centered around r6, the value of S/m would be:

$$S/m = (3/d) \times ((0.2(1/r2) + 0.6(1/r4) + 0.2(1/r6))$$

One skilled in the art can determine the number and widths of size ranges necessary to describe the particle distribution to provide a desired level of accuracy for a specific surface area calculation.

In certain embodiments, the inorganic binder of the photocatalytic coating primarily includes an alkali metal silicate binding agent. Alkali metal silicate binding agents typically include those selected from the group consisting of lithium silicate, potassium silicate, sodium silicate, and combinations thereof. In certain embodiments, alkali silicate binding agents include those selected from the group consisting of lithium silicate, potassium silicate, and combinations thereof. The alkali metal silicate is generally designated as $M_2O:SiO_2$, where M is lithium, potassium, or sodium. In certain embodiments, M is lithium or potassium. The weight ratio of $SiO_2$ to $M_2O$ typically ranges from 1.4:1 to 3.75:1, and in certain embodiments from 2.1:1 to 3.22:1.

Generally, a sufficient amount of photocatalytic particles are coated on the base ceramic granules to enable the removal of $NO_x$ from the air and oxidation to $[NO_3^-]$-containing compounds. In certain embodiments, the coating includes a plurality of photocatalytic particles in an amount of at least 45 percent by weight (wt-%), or at least 60 wt-%, based on the total weight of the coating. In certain embodiments, the coating includes a plurality of photocatalytic particles in an amount of up to 95 wt-%, or up to 80 wt-%, based on the total weight of the coating.

In certain embodiments, the photocatalytic coating includes an inorganic binder in an amount of at least 5 wt-%, at least 10 wt-%, at least 15 wt-%, or at least 20 wt-%, based on the total weight of the coating. In certain embodiments, the photocatalytic coating includes an inorganic binder in an amount of up to 55 wt-%, up to 50 wt-%, up to 45 wt-%, or up to 40 wt-%, based on the total weight of the coating.

Optionally, the photocatalytic coating includes a cross-linker, which may be the same as a hardener of the base granule. Exemplary crosslinkers include boric acid, a borate, a silicate (e.g., potassium fluorosilicate), a fluoroaluminate, an aluminosilicate, or combinations thereof. Exemplary aluminosilicate compounds include clay having the formula $Al_2Si_2O_5(OH)_4$, kaolin having the formula $Al_2O_3 \cdot 2Si_2O_2 \cdot 2H_2O$. Various combinations of crosslinkers may be included. In certain embodiments, the photocatalytic coating includes a crosslinker in an amount of at least 2 wt-%, based on the total weight of the coating. In certain embodiments, the photocatalytic coating includes a cross-linker in an amount of up to 10 wt-%, based on the total weight of the coating.

Optionally, coating of the present disclosure may include additives, such as photocatalytic activity enhancers and inorganic pore formers. Exemplary photocatalytic activity enhancers include a metal or metal oxide selected from the group consisting of Pt, Pd, Au, Os, Rh, $RuO_2$, Nb, Cu, Sn, Ni, and Fe. The combination of the photocatalytic particles with the noted metals or metal oxides can improve the photocatalytic activity. Exemplary inorganic pore formers include calcium carbonate and aluminum trihydrate. Various combinations of such optional additives may be included. In certain embodiments, an optional additive may be included in an amount of at least 1 wt-%, based on the total weight of the coating. In certain embodiments, an optional additive may be included in an amount of up to 10 wt-%, based on the total weight of the coating.

In certain embodiments, the photocatalytic coating on each base ceramic granule is at least 1 micrometer (micron) thick. In certain embodiments, the photocatalytic coating on each base ceramic granule is up to 20 microns thick. Such coating is not necessarily uniform or continuous.

Method of Making Photocatalytic Granules

The photocatalytic coating is formed from a coatable composition containing an inorganic binder and a plurality of photocatalytic particles, which is coated on previously uncoated (and typically unfired) base ceramic granules. Such intermediate coated granules are heated at a temperature of at least 700° C. to cure or sinter the base granule (if unfired) and produce a ceramic-type photocatalytic coating on the base granules. Such firing temperatures are 300-400° C. higher than that used for conventional granules. Such aggressive heat-treatment very significantly lowers the photocatalytic activity of currently used photocatalytic coatings, but more moderately lowers the activity of the photocatalytic coatings described herein. The selection of the photocatalytic particles enables a decrease in the drop of photocatalytic activity of the particles associated with high temperatures, which enables a co-firing manufacturing path (of both the base granule and photocatalytic coating) with temperatures of at least 700° C.

In certain embodiments, the coatable composition is in the form of an aqueous slurry. In certain embodiments, the aqueous slurry includes water in an amount of at least 30 percent by weight (wt-%), based on the total weight of the aqueous slurry. In certain embodiments, the aqueous slurry includes solids in an amount of at least 10 wt-%, based on the total weight of the aqueous slurry. In certain embodiments, the aqueous slurry includes Water in an amount of up to 90 wt.-%, based on the total weight of the aqueous slurry.

In certain embodiments, the aqueous slurry includes solids in an amount of up to 70 wt.-%, based on the total weight of the aqueous slurry.

Optionally, one or more dispersants may be added to the aqueous slurry to assist in dispersing the particles throughout the slurry. The appropriate level of dispersion of particles in the slurry will assist in achieving a coating on the granules having a greater uniformity. Both anionic and non-ionic dispersants may be suitable for use. The dispersant is typically used in an amount of up to 5 wt-%, or up to 2 wt-%, based on the total weight of the particles. An example of a dispersant is the sodium salt of sulfonated naphthalene-formaldehyde condensate marketed as RHODACAL N from Rhodia in Cranbury, NJ.

A coatable composition of the present disclosure is applied onto the uncoated ceramic granules to form a coating on the outer surface of the granules. For purposes of the disclosure, the term "coating" refers to one or more layers of coatings applied onto the granules. Herein, the coating is preferably directed to the complete covering of the base granule, although this is not specifically required. An exemplary process for coating the granules is generally disclosed in U.S. Pat. No. 5,411,803 (George et al.). In certain embodiments, the base ceramic granules may be initially preheated in a rotary kiln, or equivalent means, to a temperature of 65° C. to 140° C. The coatable composition is then applied to uniformly coat the granules.

In certain embodiments, the photocatalytic coating is deposited on the base ceramic granules, which may be pre-fired or unfired, in a fluidized bed coater to achieve the desired thickness. This coating method enables formation of a thin and uniform photocatalytic layer that affects the photocatalytic activity of the granule.

The rate of application for the coatable composition to an uncoated base ceramic granule (for example, unfired base ceramic granule) may vary depending on the range of components within the composition and the capabilities of the equipment being used. Those skilled in the art are capable of determining this proper rate based upon the ranges described herein. Typically, the heat of the granules drives off some of the water in the coatings to achieve a moisture level of 0.6% to 1%. The intermediate coated granules (which may or may not include previously fired base granules) are then heated to temperatures necessary to provide insolubilization of the inorganic binders and thus form a ceramic coated inorganic granule. The insolubilization of the binders renders the binders sufficiently resistant to dissolution in water or bituminous material. The heating, or firing, of the intermediate coated granules (preferably, with unfired base granules) takes place at temperatures of at least 700° C., and often up to 900° C.

The photocatalytic coated ceramic granules may optionally be post-treated to improve the handling of the material or to enhance the adhesion of the photocatalytic coated granules to other substrates. Typical treatments may include, for example, hydrocarbon oils, silicones, and inorganic chemical solutions, such as solutions of magnesium chloride, and the like. One useful silicone is known under the trade designation TEGOSIVIN HL15M7, an organosiloxane silicone oil, available from Goldschmidt Chemical, Hopewell, VA. Those skilled in the art are capable of determining the proper amount needed to achieve a desired result. The additives are generally applied during the cooling step of the coating process.

EXEMPLARY EMBODIMENTS

Embodiment 1 is a plurality of photocatalytic coated ceramic granules comprising: base ceramic granules, each having an outer surface; and a photocatalytic coating disposed on the outer surface, wherein the photocatalytic coating comprises an inorganic binder and a plurality of photocatalytic particles selected from $TiO_2$, ZnO, $Ti(OH)_4$, doped derivatives thereof, and combinations thereof, wherein the photocatalytic particles have a surface area per weight of the particles of no more than 30 square meters per gram ($m^2/g$), and wherein the photocatalytic coated ceramic granules have a Total Solar Reflectance (TSR) of at least 0.7.

Embodiment 2 is the coated ceramic granules of embodiment 1 having a TSR of at least 0.75, or at least 0.8.

Embodiment 3 is the coated ceramic granules of embodiment 1 or 2 wherein the photocatalytic particles have a surface area per weight of the particles of no more than 25 $m^2/g$, no more than 20 $m^2/g$, no more than 15 $m^2/g$, no more than 14 $m^2/g$, no more than 13 $m^2/g$, no more than 12 $m^2/g$, no more than 11 $m^2/g$, or no more than 10 $m^2/g$.

Embodiment 4 is the coated ceramic granules of any preceding embodiment wherein the photocatalytic particles have a surface area per weight of the particles of at least 1 $m^2/g$.

Embodiment 5 is the coated ceramic granules of any preceding embodiment wherein the photocatalytic particles have a mean particle size of at least 100 nanometer (nm), and in certain embodiments, at least 200 nm, at least 500 nm, or at least 1000 nm.

Embodiment 6 is the coated ceramic granules of any preceding embodiment wherein the photocatalytic particles have a mean particle size of up to 3000 nm, up to 2000 nm, or up to 1000 nm.

Embodiment 7 is the coated ceramic granules of any preceding embodiment wherein the plurality of photocatalytic particles comprise $TiO_2$ (e.g., anatase $TiO_2$).

Embodiment 8 is the coated ceramic granules of any preceding embodiment wherein the inorganic binder in the photocatalytic coating comprises an alkali metal silicate binding agent.

Embodiment 9 is the coated ceramic granules of embodiment 8 wherein the alkali metal silicate binding agent is selected from lithium silicate, potassium silicate, sodium silicate, and combinations thereof.

Embodiment 10 is the coated ceramic granules of embodiment 9 wherein the alkali silicate binding agent is selected from lithium silicate, potassium silicate, and combinations thereof.

Embodiment 11 is the coated ceramic granules of any preceding embodiment wherein the photocatalytic coating comprises a plurality of photocatalytic particles in an amount of at least 45 percent by weight (wt-%), or at least 60 wt-%, based on the total weight of the coating.

Embodiment 12 is the coated ceramic granules of any preceding embodiment wherein the photocatalytic coating comprises a plurality of photocatalytic particles in an amount of up to 95 wt-%, or up to 80 wt-%, based on the total weight of the coating.

Embodiment 13 is the coated ceramic granules of any preceding embodiment wherein the photocatalytic coating comprises an inorganic binder in an amount of at least 5 wt-%, at least 10 wt-%, at least 15 wt-%, or at least 20 wt-%, based on the total weight of the coating.

Embodiment 14 is the coated ceramic granules of any preceding embodiment wherein the photocatalytic coating comprises an inorganic binder in an amount of up to 55 wt-%, up to 50 wt-%, up to 45 wt %, or up to 40 wt-%, based on the total weight of the coating.

Embodiment 15 is the coated ceramic granules of any preceding embodiment wherein the photocatalytic coating further comprises a crosslinker.

Embodiment 16 is the coated ceramic granules of embodiment 15 wherein the crosslinker is selected from boric acid, a borate, a silicate, a fluoroaluminate, an aluminosilicate, and combinations thereof.

Embodiment 17 is the coated ceramic granules of embodiment 15 or 16 wherein the photocatalytic coating comprises a crosslinker in an amount of at least 2 wt-%, based on the total weight of the coating.

Embodiment 18 is the coated ceramic granules of any of embodiments 15 through 17 wherein the photocatalytic coating comprises a crosslinker in an amount of up to 10 wt-%, based on the total weight of the coating.

Embodiment 19 is the coated ceramic granules of any preceding embodiment wherein the photocatalytic coating further comprises one or more optional additives selected from a photocatalytic activity enhancer, an inorganic pore former, and combinations thereof.

Embodiment 20 is the coated ceramic granules of embodiment 19 wherein the photocatalytic coating comprises one or more additives in an amount of at least 1 wt-%, based on the total weight of the coating.

Embodiment 21 is the coated ceramic granules of embodiment 19 or 20 wherein the photocatalytic coating comprises one or more additives in an amount of up to 10 wt-%, based on the total weight of the coating.

Embodiment 22 is the coated ceramic granules of any preceding embodiment wherein the photocatalytic coating on each base ceramic granule is at least 1 micron thick.

Embodiment 23 is the coated ceramic granules of any preceding embodiment wherein the photocatalytic coating on each base ceramic granule is up to 20 microns thick.

Embodiment 24 is the coated ceramic granules of any preceding embodiment wherein the base ceramic granules have a TSR of at least 0.7, at least 0.75, or at least 0.8.

Embodiment 25 is the coated ceramic granules of any preceding embodiment wherein the base ceramic granules comprise a plurality of ceramic particles.

Embodiment 26 is the coated ceramic granules of embodiment 25 wherein the base ceramic granules comprise a plurality of ceramic particles, an inorganic binder, and optionally a hardener.

Embodiment 27 is the coated ceramic granules of any preceding embodiment wherein the base ceramic granules comprise an inorganic core having an outer surface and a shell on and surrounding the outer surface.

Embodiment 28 is the coated ceramic granules of embodiment 27 wherein the inorganic core is a solid ceramic core.

Embodiment 29 is the coated ceramic granules of embodiment 27 wherein the inorganic core is at least one of a crystalline, a glass, or a glass-ceramic.

Embodiment 30 is the coated ceramic granules of any of embodiments 27 through 29 wherein the core has a diameter of at least 200 micrometers.

Embodiment 31 is the coated ceramic granules of any of embodiments 27 through 30 wherein the shell has a thickness of at least 50 micrometers, and in certain embodiments, up to 400 micrometers.

Embodiment 32 is the coated ceramic granules of any of embodiments 27 through 31 wherein the shell comprises ceramic particles bound together with an inorganic binder (i.e., a binder distinct from the photocatalytic coating binder, although these binders could be compositionally the same or similar).

Embodiment 33 is the coated ceramic granules of embodiment 32 wherein the shell comprises at least first and second concentric layers, wherein the first concentric shell layer is closer to the core than the second concentric shell layer, wherein the first concentric shell layer comprises ceramic particles bound together with an inorganic binder.

Embodiment 34 is the coated ceramic granules of embodiment 32 or 33 wherein the inorganic binder comprises a reaction product of at least an alkali silicate and a hardener.

Embodiment 35 is the coated ceramic granules of embodiment 34 wherein the hardener is amorphous.

Embodiment 36 is the coated ceramic granules of embodiment 34 or 35 wherein the hardener is selected from aluminum phosphate, an aluminosilicate, a cryolite, a calcium salt, a calcium silicate, and combinations thereof.

Embodiment 37 is the coated ceramic granules of any of embodiments 32 through 36 wherein the ceramic particles are present in an amount of greater than 50 wt-% of the shell of the respective base ceramic granule, based on the total weight of the shell of the respective base ceramic granule.

Embodiment 38 is the coated ceramic granules of any preceding embodiment wherein the ceramic particles of each base ceramic granule include no more than 10 wt-% $TiO_2$, based on the total weight of either the core or base ceramic granule, for the respective core or base ceramic granule.

Embodiment 39 is the coated ceramic granules of any preceding embodiment wherein the ceramic particles of each base ceramic granule include no more than 10 wt-% $Al_2O_3$, based on the total weight of either the core or base ceramic granule, for the respective core or base ceramic granule.

Embodiment 40 is the coated ceramic granules of any preceding embodiment wherein the photocatalytic coating of the coated ceramic granules demonstrate photocatalytic activity of greater than $10 \times 10^5$, or greater than $100 \times 10^5$ in relative TPA activity units.

Embodiment 41 is a method of making photocatalytic coated ceramic granules comprising base ceramic granules, each having an outer surface, and a photocatalytic coating disposed on the outer surface, the method comprising:

providing a coatable composition containing an inorganic binder and a plurality of photocatalytic particles selected from $TiO_2$, ZnO, $Ti(OH)_4$, doped derivatives thereof and combinations thereof wherein the photocatalytic particles have a surface area per weight of the particles of no more than 30 square meters per gram (m^2/g);
    applying the coatable composition to uncoated base ceramic granules to form intermediate coated granules; and
    heating the intermediate coated granules at a temperature of at least 700° C. to produce the photocatalytic coated ceramic granules having a Total Solar Reflectance (TSR) of at least 0.7.

Embodiment 42 is the method of embodiment 41 wherein the coatable composition is an aqueous slurry, preferably comprises water in an amount of at least 30 wt-%, based on the total weight of the aqueous slurry.

Embodiment 43 is the method of embodiment 42 wherein the aqueous slurry further comprises a dispersant.

Embodiment 44 is the method of any of embodiments 41 through 43 wherein the uncoated base ceramic granules are unfired.

Embodiment 45 is the method of any of embodiments 41 through 44 wherein heating the intermediate coated granules occurs at a temperature of up to 900° C.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims. Unless otherwise stated, all amounts are in grams.

Method of Making Granules

Laboratory produced ceramic base granules were used for Examples 1-2, and Comparative Example 1 (Comp Ex 1). They were made using the procedure given below. Industrially produced ceramic base granules were used for Example 3 and Comparative Examples (Comp Ex 2-3). Laboratory produced ceramic base granules analogous to these industrially produced ceramic base granules can be made using the following procedure as well. Although the data presented in Table 3 for Example 3 and Comp Ex 2-3 are for the industrially produced ceramic base granules, it is believed that analogous data would result if the following procedure were used to produce them.

Ceramic base granules were prepared by applying a thick reflective coating layer in a form of aqueous slurry on crushed mineral cores as follows: Grade #11 crushed uncoated naturally occurring dacite mineral (obtained from 3M Company, St. Paul, MN) was screened to 14 grade using –14 mesh U.S. sieve (see Table 1 for grade size distributions), suspended in a fluidized bed coater (obtained under the trade designation "GLATT GPCG-1" from Glatt, Weimar, Germany), and equilibrated at targeted temperature (25-30° C.) prior to application of coating slurry.

TABLE 1

| U.S. Sieve Range | Weight percent of material | | |
| --- | --- | --- | --- |
| | 11 Grade | 14 Grade | 18 Grade |
| +8M | 0-0.1 | 0 | 0 |
| –8 + 12 | 4-10 | 0-0.3 | 0-0.5 |
| –12 + 16 | 30-50 | 0.5-15 | 0-6 |
| –16 + 20 | 20-40 | 38-62 | 2-20 |
| –20 + 30 | 10-30 | 23-38 | 40-80 |
| –30 + 40 | 1-10 | 1-18 | 10-45 |
| –40M | 0-2 | 0-4 | 0-10 |

Aqueous slurries for forming the shell coating of a core-shell granule were formulated using raw materials listed in Table 2 taken in proportions (in grams) listed in Table 3 (referred to "Base Granules"). The slurries were made generally as follows: Minex 4 and Metamax were combined with water to fabricate an aqueous slurry comprising about 60 wt-% of solids and milled in a vertical attrition mill until median particle size around 3.5 microns is reached. Next, the obtained slurry was combined with water and liquid silicate ("STAR") resulting in a slurry of final formulation comprising 30.4 wt-% of solids. The final slurry was stirred vigorously and mixed via high shear using a Cowles blade at 500 revolutions per minute (rpm) for at least 15 minutes (min) and maintained in suspension via continuous stirring while being pumped into fluidized bed coater. In the coater, the slurry spray rate was kept as high as possible without accumulating moisture in the product bed. Product temperature was kept in the range 26-32° C., the atomizing pressure was 20-35 pounds per square inch (psi) (138-241 kiloPascals (kPa)), the fluidizing air was 1000-1200 feet per minute (fpm) (5-6 meters per second (m/s)) and the spray rate was 25-40 grams per minute (g/min). The fluidizing air was generally kept as low as possible while maintaining fluidized bed motion. Typical settings of batch fluid bed coater that was used as outlined below.

Solids starting charge, grams (g) 1000-1300
    Air velocity, 5-6 meters per second (mps)
    Process Temp setpoint, ° C. 60-80
    Process Temp reading, ° C. 60-80
    Product Temp, ° C. 25-30
    Pressure Drop (D/P) across filter, range 50-100
    D/P across material bed, range 50-150
    Relative Humidity (R/H) in exhaust air, range, % 30-50
    Atomizing air pressure, kPa 172-210
    For a batch of 1-2 kilograms (kg) of core granules (i.e., the core of core-shell base granules), the coating process to form a shell coating of final thickness of approximately 300 micrometers took about 2-3 hours. Final thickness of the first coating layer of Examples 1-3 and Comparative Examples (Comp Ex 2-3) ranged from 200 to 400 micrometers, which corresponded to about 50-85 wt-% of the whole granule construction.

Ceramic Granules for Comparative Example 1 were prepared as follows: the slurry components in the proportions (in grams) indicated in Table 3 were combined in a vertical mixer with 15 grams of additional water to prepare an aqueous slurry. The core granule substrate in the proportions (in grams) indicated in Table 3 was pre-heated to 90-95° C. and then combined with the prepared aqueous slurry in a vertical or horizontal mixer. Grade #11 uncoated cores were used as the substrate for the base granule. The slurry coated base granules were then fired in a rotary kiln (natural gas/oxygen flame) reaching the indicated temperature over a period of 10-20 min. Following the firing the granules were allowed to cool to room temperature. The components and proportions (in grams) of the photocatalytic coating composition for Comparative Example 1 is listed in Table 3 were combined and coated on this fired base granule using the same method as the shell layer on the core granule substrate.

General Method of Applying Photocatalytic Coating

The photocatalytic coating layer is designed as final thin layer (1-20 microns) applied in a fluidized bed coater on base granules of Examples 1-3 and Comparative Examples (Comp Ex 2-3) described above. The components and proportions of such components (in grams) of the photo-catalytic coating compositions are listed in Table 3. The coating was applied in a lab-scale fluidized bed coater. Aqueous slurries for coating were formulated using raw materials listed in Table 2 taken in proportions (in grams) listed in Table 3. To prepare photocatalytic coating slurries, titania powders were suspended in water with silicate and boric acid solution. The slurries were constantly agitated during application at 100 rpm. For photocatalytic coating application, product temperature was kept in the range of 20-25° C., atomizing pressure 20-35 psi (138-241 kPa), fluidizing air 1000-1200 fpm (5-6 m/s) and spray rate 10-15 g/min. Once the coating process was complete, granules were taken out of the coater and placed into a batch oven, where they were heated to the temperatures listed in Table 3 at a rate of about 200° C. per hr, held at temp for 5 min for EX3, CEX2&3, and for 1 hr for EX1&2 furnace power was shut off at the end of the hold time and samples removed from batch oven within 10-20 min from the end of the hold time. Characteristics of these granules are represented by Examples 1-3 and Comparative Examples (Comp Ex 1-3) in Table 3.

Method for Determining Particle Size Distribution

Particle size of the titanium dioxide was measured by laser diffraction using Horiba LA-950V/LA-950V2 (Horiba, Kyoto, Japan). The following refractive index values were used for the calculation:water (1.33) and $TiO_2$ (2.488). The dispersion was diluted to approximately 1 wt-% solids with water. The diluted sample was then added to the measurement cell which was filled with water until the transmittance was between the recommended levels of 85-95%. A particle size distribution of D50 is also known as the median diameter of the particle size distribution. It is the value of the particle diameter at 50% in the cumulative distribution.

Method for Determining Specific Surface Area

The Brunauer, Emmett and Teller (BET) surface area (i.e., specific surface area or SSA) of $TiO_2$ powders was determined by $N_2$ adsorption. More specifically, samples were characterized by $N_2$ adsorption at 77K using a gas sorption analyzer (obtained under the trade designation "MICROMERITICS"; Model ASAP-2020 from Micromeritics Instruments, Norcross, GA). Each specimen was outgassed for 24 hours at 573K to remove any moisture or adsorbed contaminants that may have been present on the surface. The results of this test for titania powders are represented in Table 2.

Method for Determining Granule Reflectivity (TSR)

The Examples were tested for reflectivity using a spectrum reflectometer (obtained as Model SSR-ER v6 from Devices and Services Co., Dallas, TX) using a 1.5E air mass setting. For "Cup" measurements, granules were loaded into a sample holder with a depth of approximately 5 millimeters (mm). The surface of the granules was leveled using a roller. Results of this study for the granules are represented in Table 3 as "Rcup."

Method for Determining Photocatalytic Activity

"Relative TPA activity units" as noted above are determined using the following test method. The granules were sieved through a −16/+20 mesh, washed 5 times by deionized water, and then dried at 240° F. (116° C.) for about 20 minutes. A sample of 40 grams (g) of the dried granules was placed into a 500 milliliters (mL) crystallization dish. Aqueous disodium terephthalate solution (500 g of $10^{-4}$ M) was then added to the dish. The mixture was stirred using a bar placed in a submerged small Petri dish and driven by a magnetic stirrer underneath the crystallization dish. The mixture was exposed to ultraviolet (UV) light produced by an array of 4, equally spaced, 4-ft (1.2-m) long black light bulbs (Sylvania 350 BL 40W F40/350BL). The height of the bulbs was adjusted to provide about 2.3 mW/cm$^2$ UV flux measured using a VWR Model 21800-016 UV Light Meter (VWR International, West Chester, PA) equipped with a UVA Model 365 Radiometer (Solar Light Company, Glenside, PA) having a wavelength band of 320-390 nanometers (nm). During irradiation, about 3 mL of the mixture was removed with a pipet at about 5-minute intervals and transferred to a disposable 4-window polymethylmethacrylate or quartz cuvette. The mixture in the cuvette was then placed into a Fluoromax-3 spectrofluorometer (Jobin Yvon, Edison, NJ). The fluorescence intensity measured at excitation wavelength of 314 nm and emission wavelength of 424 nm was plotted. A comparison of this slope with that for the aqueous disodium terephthalate solution provided the relative photoactivity (S1/R1) of the granules as reported. In general, the larger the reported value, the greater the photoactivity of the granules. Results of this test are represented in Table 3 as "TPA activity."

TABLE 2

| Raw Materials | | |
|---|---|---|
| Material | Description | Source |
| 3M Mineral, "14 grade" 3M Mineral "11 grade" | Crushed rock, particle size distributions are listed in Table 1 | 3M Co., St. Paul, MN |
| PD sodium silicate | Sodium silicate solution in water 39.4 wt-% solids, wt. ratio $SiO_2/K_2O$ = 2.75 | PQ Corp., Valley Forge, PA |
| STAR sodium silicate | Sodium silicate solution on water 37.1 wt-% solids, wt. ratio $SiO_2/K_2O$ = 2.5 | |
| KSIL1 | Potassium silicate solution 29.1 wt-% solids, wt. ratio $SiO_2/K_2O$ = 2.5 | |
| Kaolin Clay RP2, powder | Kaolin Clay | Active Minerals International LLC, FL |
| Metamax | Calcined Kaolinite, $Al_2Si_2O_5$ with average particle size: 1.3 microns (according to manufacturer) | BASF Corp., Country-side, IL |
| Minex 4, powder | Silica deficient, sodium-potassium alumina silicate mineral, Nepheline Syenite, median particle size of 6.8 microns (according to manufacturer) | Sibelco Company, Charlotte, NC |
| Carbon Black N660 | Pigment | Continental Carbon Company, TX |
| Bayferrox 950 Tan | | Bayer Corp, Leverkusen, Germany |
| Chrome Oxide Green | | Yipin Pigments, Shanghai, China |
| Cristal AT1 | Crystalline $TiO_2$ with Anatase structure, BET SSA = 10.2 $m^2/g$; particle size after de-agglomeration by 1-minute sonication in water (Horiba): $D_{50}$ = 0.35 microns (measured by Method for Determining Particle Size Distribution described above) | Tronox, New York, NY |
| DT20 | Crystalline $TiO_2$ with Anatase structure, BET SSA = 22 $m^2/g$ | |
| AERODISP W 740 X | Crystalline $TiO_2$ dispersed in water, 40 wt-% Crystalline $TiO_2$ with predominantly Anatase structure, BET SSA = 35-65 $m^2/g$. Particle size distribution is a mixture of small particles with 20-40 nm diameters and large particles with 60-100 nm diameters (according to manufacturer) | Evonik Corp., Parsippany, NJ |
| Boric Acid | 2 wt-% solution in water | Hawkins Inc., Roseville, MN |

TABLE 3

| | | Coating Formulations | | | | | |
|---|---|---|---|---|---|---|---|
| | | EX 1 | EX 2 | EX 3 | Comp EX 1 | Comp EX 2 | Comp EX 3 |
| Base Granules | 3M Mineral, "11 grade" | | | | 983.6 | | |
| | 3M Mineral, "14 grade" | 330 | 330 | 340 | | 340 | 340 |
| | PD sodium silicate, solids | | | | 6.8 | | |
| | STAR sodium silicate, solids | 111.5 | 111.5 | 130 | | 130 | 130 |
| | Kaolin Clay RP2, powder | | | | 7.6 | | |
| | Metamax, powder | 139.6 | 139.6 | 86 | | 86 | 86 |
| | Minex 4, powder | 418.8 | 418.8 | 444 | | 444 | 444 |
| | Pigments | | | | 2 | | |

TABLE 3-continued

| | | EX 1 | EX 2 | EX 3 | Comp EX 1 | Comp EX 2 | Comp EX 3 |
|---|---|---|---|---|---|---|---|
| | | | | Coating Formulations | | | |
| Photocatalytic Coating | KSIL1 potassium silicate, solids (binder) | 3.7 | 3.7 | 3.7 | 0.9 | 1.8 | 1.8 |
| | Boric Acid, solids (crosslinker) | 0.8 | 0.8 | 0.8 | 0.2 | 0.4 | 0.4 |
| | AERODISP W 740, solids | | | | 1.2 | 2.6 | 2.6 |
| | DT20 $TiO_2$ powder | 16.1 | | 16.1 | | | |
| | $TiO_2$ Cristal AT1, powder | | 16.1 | | | | |
| | Firing T, ° C. | 750 | 750 | 850 | 370 | 800 | 900 |
| | Rcup (TSR) | 0.797 | 0.785 | 0.762 | 0.119 | 0.744 | 0.752 |
| | 30 min TPA activity, S1/R1 × $10^5$ | 295.4 | 263.1 | 27.3 | 128.5 | 3.6 | 0.5 |

The photocatalytic coatings of the coated ceramic granules described herein demonstrate photocatalytic activity of granules above $10 \times 10^5$ in relative TPA activity units after co-firing at 850° C. or 750° C.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A method of making photocatalytic coated ceramic granules comprising base ceramic granules, each having an outer surface, and a photocatalytic coating disposed on the outer surface, the method comprising:

providing a coatable composition containing an inorganic binder and a plurality of photocatalytic particles selected from the group consisting of: $TiO_2$, ZnO, $Ti(OH)_4$, doped derivatives thereof, and combinations thereof, wherein the plurality of photocatalytic particles comprise anatase $TiO_2$, wherein the photocatalytic particles have a surface area per weight of the particles of no more than 25 square meters per gram ($m^2$/g);

applying the coatable composition to uncoated base ceramic granules to form intermediate coated granules; and heating the intermediate coated granules at a temperature of at least 700° C. to produce the photocatalytic coated ceramic granules having a Total Solar Reflectance (TSR) of at least 0.7, wherein the photocatalytic coated ceramic granules demonstrate a photocatalytic activity of greater than $10 \times 10^5$ in Relative TPA activity units after heating at a temperature of at least 700° C.

2. The method of claim 1, wherein the coatable composition is an aqueous slurry.

3. The method of claim 2, wherein the aqueous slurry further comprises a dispersant.

4. The method of claim 1, wherein the uncoated base ceramic granules are unfired.

5. The method of claim 1, wherein heating the intermediate coated granules occurs at a temperature from 700° C. to 900° C.

6. The method of claim 5, wherein the photocatalytic coated ceramic granules demonstrate a photocatalytic activity of greater than $10 \times 10^5$ in Relative TPA activity units after heating at a temperature of at least 900° C.

7. The method of claim 1, wherein the intermediate coated granules are heated at a temperature of at least 750° C. to produce the photocatalytic coated ceramic granules.

8. The method of claim 7, wherein the photocatalytic coated ceramic granules demonstrate a photocatalytic activity of greater than $100 \times 10^5$ in relative TPA activity units after heating at a temperature of at least 750° C.

9. The method of claim 1, wherein the intermediate coated granules are heated at a temperature of at least 800° C. to produce the photocatalytic coated ceramic granules.

10. The method of claim 1, wherein the intermediate coated granules are heated at a temperature of at least 850° C. to produce the photocatalytic coated ceramic granules.

11. The method of claim 10, wherein the photocatalytic coated ceramic granules demonstrate a photocatalytic activity of greater than $10 \times 10^5$ in relative TPA activity units after heating at a temperature of at least 850° C.

12. The method of claim 1, wherein the photocatalytic particles have a surface area per weight of the particles of no more than 11 square meters per gram ($m^2$/g).

13. The method of claim 1, wherein the photocatalytic coated ceramic granules demonstrate a photocatalytic activity of greater than $100 \times 10^5$ in relative TPA activity units after heating at a temperature of at least 850° C.

* * * * *